(12) United States Patent
Nakajima

(10) Patent No.: US 6,281,958 B1
(45) Date of Patent: Aug. 28, 2001

(54) IN-PLANE TYPE LIQUID CRYSTAL DISPLAY DEVICE HAVING EVEN INCLINING DIRECTIONS OF ELECTRIC FIELD LINES

(75) Inventor: Mutsumi Nakajima, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/219,058

(22) Filed: Dec. 22, 1998

(30) Foreign Application Priority Data

Dec. 26, 1997 (JP) .................................................. 9-359045

(51) Int. Cl.[7] .................................................. G02F 1/1343

(52) U.S. Cl. .................................................. 349/141

(58) Field of Search .............................. 349/39, 141, 143, 349/144

(56) References Cited

U.S. PATENT DOCUMENTS 5,760,856 * 6/1998 Yanagawa et al. ..................... 349/42
5,905,556 * 5/1999 Suzuki et al. ......................... 349/141

OTHER PUBLICATIONS

"13.4: Analysis and Control of Extraordinary Domains in Wide–Viewing–Angle In–Plane–Switching Mode TFT–LCDs", T. Suzuki et al., SID 97 Digest, pp. 184–187 (1997).

* cited by examiner

Primary Examiner—James A. Dudek
Assistant Examiner—Andrew Schechter
(74) Attorney, Agent, or Firm—Dike, Bronstein, Roberts & Cushman IP Group; David G. Conlin; George W. Hartnell, III

(57) ABSTRACT

In order to provide a liquid crystal display panel using a horizontal electric field driving system that causes no uneven alignment of a liquid crystal molecule in one pixel, the present invention has a construction in which, with regard to each display section which is surrounded by the pixel electrode and the common-use electrode, a first side and a second side are constituted by one of the pixel electrode and the common-use electrode, and a third side and a fourth side are constituted by the other. Further, a main wire of the common-use electrode and a gate line have the display section disposed therebetween so as to keep a certain interval. The above-mentioned arrangement makes it possible to eliminate influence of an electric field which exists outside the display section, to generate electric lines of force which achieve even rotating directions of liquid crystal molecules in all display sections of the pixel when voltage is applied, and consequently to greatly improve display quality without causing any disclination lines.

28 Claims, 7 Drawing Sheets

IN-PLANE TYPE LIQUID CRYSTAL DISPLAY DEVICE HAVING EVEN INCLINING DIRECTIONS OF ELECTRIC FIELD LINES

FIELD OF THE INVENTION

The present invention relates to a matrix liquid crystal display panel which is used for, for example, television sets, personal computers, word processors, and other office automation(OA) equipments.

BACKGROUND OF THE INVENTION

A liquid crystal display panel has been widely used for, for example, television sets, personal computers, and display sections of other office automation equipment thanks to its thinner structure and lighter weight as compared with a display device using a cathode-ray tube, etc.

As a display system of the liquid crystal display panel, the twisted nematic(TN)type has been conventionally used in many cases. In the TN type, nematic liquid crystal is sealed into a gap between transparent electrode substrates, and liquid crystal molecules are disposed between the two substrates with each of the major axes being twisted by 90° in succession, and a vertical electric field driving system, which carries out an image display by driving the liquid crystal molecules using an electric field arranged vertical to the transparent electrode substrate. However, in the above-mentioned liquid crystal display panel which uses the vertical electric field driving system such as the above-mentioned TN type, the actual anisotropy of refractive index varies for each viewing angle. Namely, this system has high dependency upon the viewing angle.

Here, a horizontal electric field driving system has been developed in earnest for improving viewing angle property, that is, for realizing a wide viewing angle in response to recent needs for a large-size display, etc. The horizontal electric field driving system is a system in which liquid crystal molecules are rotated by using a horizontal electric field in the in-plane direction to the substrate so as to provide an image display. Since the major axis of the liquid crystal molecule is always arranged in parallel with the substrate, the optical property inherently does not vary for each viewing angle.

Japanese Laid-Open Patent Publication No.36058/1995 (Tokukaihei 7-36058) discloses some kinds of electrode structures which use the horizontal electric field driving system. Referring to figures, the following explanation describes one example of a conventional liquid crystal display panel disclosed in the aforementioned Patent Publication which uses the horizontal electric field driving system.

FIG. 7 is a top view illustrating one pixel of the conventional liquid crystal display panel which uses the horizontal electric field driving system. This liquid crystal display panel is arranged in a manner so as to have liquid crystal sealed into a gap between two insulating substrates(not shown) opposing each other.

In FIG. 7, on a first insulating substrate (not shown), gate lines 91 and a common line 92 are formed so as to be in parallel with each other. A source line 93 is provided in the direction orthogonal to the gate line 91 and the common line 92. A thin film transistor (TFT) 94 is provided on the gate line 91, and a pixel electrode 95, which is connected with the source line 93 via the TFT 94, is arranged in parallel with the source line 93. Further, in the vicinity of a source line 93' which is disposed on the other end of the pixel, a common electrode 96, which branches out from the common line 92, is arranged in parallel with the source line 93'. Incidentally, an area which is surrounded by a pair of the gate lines 91 and a pair of the source lines 93 and 93' corresponds to one pixel.

These electrode wires are coated with an alignment film (not shown) which is provided on the insulating substrate. This substrate is arranged so as to oppose a second insulating substrate which is provided with an alignment film on the surface thereof in the same manner as the first insulating substrate. Liquid crystal is sealed between these two substrates. Further, this liquid crystal is subjected to an optical modulation in a display section 97 disposed between the pixel electrode 95 and the common electrode 96 which are arranged in parallel with each other.

Moreover, the alignment film is subjected to an aligning operation by using a rubbing method, etc. The aligning operation differs depending upon the dielectric-constant anisotropy of the liquid crystal molecule to be used. For example, in the case when a liquid crystal molecule 98 with positive dielectric-constant anisotropy is driven, as shown in FIG. 7, an initial aligning direction of a liquid crystal molecule 98 is arranged virtually in parallel with both the pixel electrode 95 and the common electrode 96, and is arranged so as to be inclined somewhat clockwise when viewed from the side of the second insulating substrate. Moreover, as shown in FIG. 7, each broken line passing one end of the liquid crystal molecule 98 indicates the direction in parallel with the pixel electrode 95 and the common electrode 96. With this arrangement, when voltage is applied between the pixel electrode 95 and the common electrode 96, the liquid crystal molecule 98 rotates so as to achieve the optical modulation.

However, in and around the display section 97, the gate line 91, the common line 92, and the source lines 93 and 93' are provided in addition to the pixel electrode 95 and the common electrode 96 which apply voltage for driving the liquid crystal molecule 98; therefore, it is very difficult to apply a uniform horizontal electric field to the substrate in the in-plane direction. The reason why is that voltage is applied to each of the electrodes and wires that are disposed in the vicinity of the display section 97 so that electric fields newly appear and affect one another.

The following explanation describes the relationship between the state of electric lines of force in the above-mentioned uneven horizontal electric fields and the aligning directions of the liquid crystal molecule.

As shown FIG. 7, during a writing period, to the gate line 91 is inputted a signal with electric potential which is relatively positive based on the electric potential of the common line 92 and the common electrode 96; meanwhile, electric potential, which is relatively negative, is applied during the other period(holding period).

Therefore, in the case when the pixel electrode 95 is applied a signal with electric potential which is relatively positive based on the electric potential of the common line 92 and the common electrode 96, during the holding period, as shown in the model of FIG. 7, an electric line of force 99 extends from the pixel electrode 95 in any one of directions of the common electrode 96, the common line 92, or the gate line 91.

Incidentally, in the case of the liquid crystal molecule with positive dielectric constant anisotropy, upon applying voltage, torque is exerted in the major axis direction of the liquid crystal molecule along the electric line of force.

Namely, as shown in FIG. 7, in the case of the liquid crystal molecule 98 with positive dielectric constant anisotropy, upon applying voltage, torque is exerted to in the major axis direction of the liquid crystal molecule 98 along the electric line of force 99. Therefore, as shown in FIG. 7, in an area A in which the electric line of force 99 virtually orthogonal to the pixel electrode 95 and the common electrode 96, during the holding period, when to the pixel electrode 95 is applied a signal with electric potential which is relatively positive based on the electric potential of the common line 92 and the common electrode 96, a liquid crystal molecule 98a, which exists close to the pixel electrode 95 in the area A, rotates in the direction of an arrow(to the right) in accordance with the initial aligning direction shown in FIG. 7. At this time, in an area B of the same pixel as well, when voltage is applied, a liquid crystal molecule 98b rotates in the direction of an arrow(to the right) in accordance with the initial aligning direction; however, in an area C, a liquid crystal molecule 98c rotates in the direction of an arrow(to the left) with regard to the initial aligning direction. In other words, in one pixel, some of the liquid crystal molecules 98 rotate to the opposite direction. Such a phenomenon is called a reverse twist. Further, a boundary, which appears between the area in which the liquid crystal molecule 98 rotates in the clockwise direction and the area in which the liquid crystal molecule 98 rotates in the counterclockwise direction, is called a disclination line. The disclination line is caused by the reverse twist.

As described above, referring to FIG. 7, in the vicinity of a disclination line 100, signal voltage does not carry out a controlling operation for achieving the even rotating directions of the liquid crystal molecules 98; therefore, roughness occurs and brightness is reduced on the screen of the liquid crystal display panel.

SUMMARY OF THE INVENTION

The objective of the present invention is to provide a liquid crystal panel which achieves even inclining directions of electric lines of force in the entire liquid crystal display panel so as to prevent roughness and a reduction in brightness on the screen, that are caused by reverse twist, without decreasing a non-defective rate.

In order to solve the aforementioned problem, the liquid crystal display panel of the present invention using a horizontal electric field driving system, in which a liquid crystal layer is sandwiched between a pair of opposing substrates, a plurality of gate lines and a plurality of source lines are disposed virtually orthogonally to one another between the pair of substrates, and a pixel is surrounded by the gate lines and the source lines, is characterized in that: the pixel is provided with (a)an active element, (b)a pixel electrode which is connected with the source line via the active element and has wires disposed virtually in parallel with the source line, and (c)a common-use electrode which includes a main wire disposed virtually in parallel with the gate line and includes sub wires branching out from the main wire in two directions so as to be arranged virtually in parallel with the source line; an area surrounded by the pixel electrode and the common-use electrode serves as a display section; and the pixel electrode and the common-use electrodes are arranged so as to generate electric lines of force which achieve the even rotating directions of liquid crystal molecules in all display sections of the pixel when voltage is applied.

In the pixel, the above-mentioned arrangement has at least two display sections surrounded by the pixel electrode and the common-use electrode, that are disposed in the direction of the source line. The main wire of the common-use electrode is disposed between the display sections.

Namely, the main wire of the common-use electrode and the gate line are arranged with a certain interval with the display section being disposed therebetween; thus, it is possible to prevent leakage from occurring between the common electrode and the gate line as compared with the case in which the main wire of the common-use electrode extends along the gate line.

Further, in each display section of the pixel, the pixel electrode and the common-use electrode are arranged so as to generate the electric lines of force which achieve the even rotating directions of the liquid crystal molecules when voltage is applied; therefore, it is possible to reduce irregularity in the aligning directions that is caused by the uneven horizontal electric field. Consequently, it becomes possible to provide a liquid crystal display panel which can prevent roughness and a reduction in brightness on the screen.

For a fuller understanding of the nature and advantages of the invention, reference should be made to the ensuing detailed description taken in conjunction with the accompanying drawings.

DESCRIPTION OF THE EMBODIMENTS

EMBODIMENT 1

Referring to figures, the following explanation will discuss one embodiment of the present invention.

Figure 1:
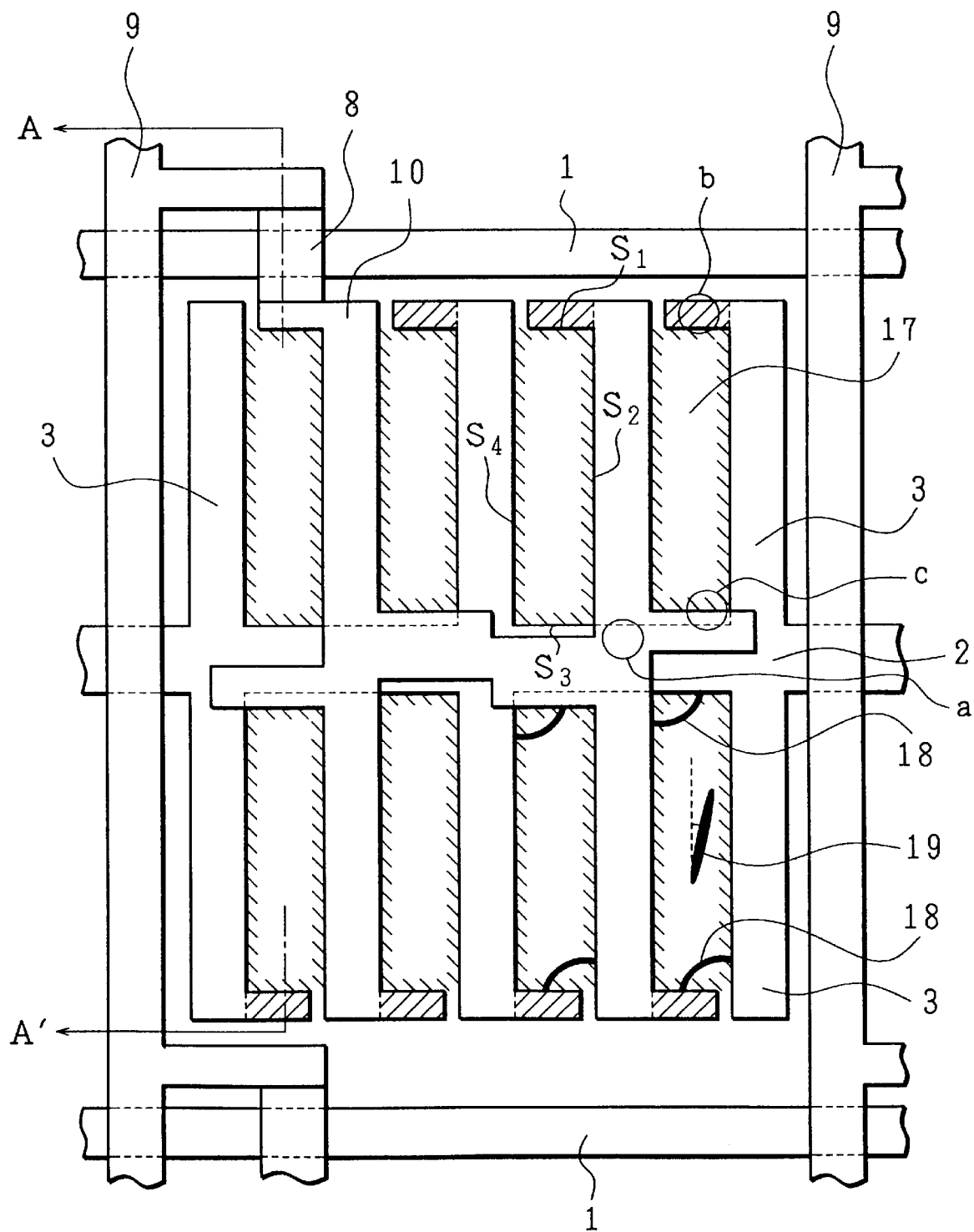
FIG. 1 is a top view showing one embodiment of a pixel of a liquid crystal display panel in accordance with the present invention.
Figure 2:
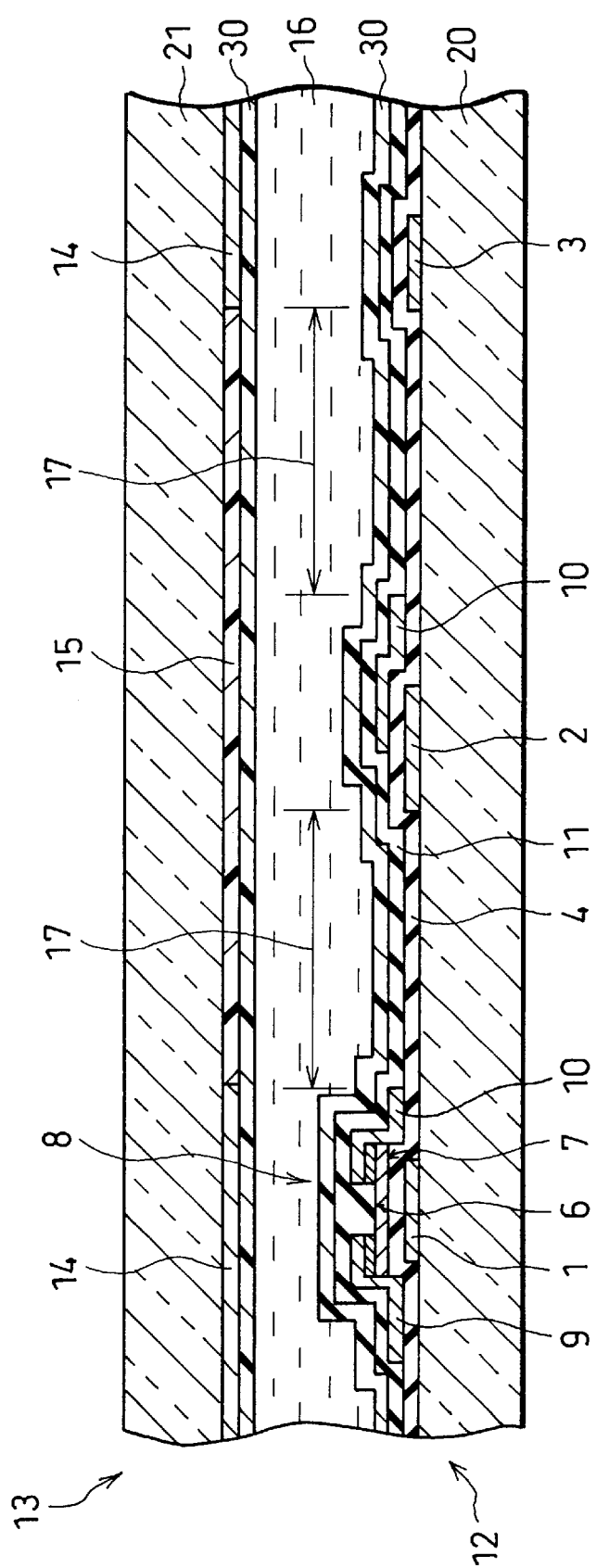
FIG. 2 is a sectional view that is cut on the line A–A' of FIG. 1 or showing the liquid crystal display panel in accordance with one embodiment of the present invention.

FIG. 1 is a top view showing one pixel of the present embodiment. FIG. 2 is an A–A' sectional view of FIG. 1.

A liquid crystal display panel of the present embodiment has electrodes arranged between a pair of insulating substrates as shown in FIG. 1. FIG. 2 shows a vertical arrangement of electrodes. Further, as shown in FIG. 1, an area, which is surrounded by a pair of gate lines 1 and a pair of source lines 9, corresponds to one pixel.

As shown in FIGS. 1 and 2, an active-matrix substrate 12 is provided with the gate lines 1 and a common line (main wire) 2, which crosses a central portion of the pixel in parallel with the gate line 1, on an insulating substrate 20. Moreover, common electrodes(sub wire) 3 branch out from the common line 2 in pairs at a plurality of places of the pixel so as to extend in two directions orthogonal to the common line 2. Further, each top portion of the common electrodes 3 is bent so as to extend along the gate line 1, that is, to be virtually in parallel with the gate lines 1. Additionally, as shown in FIG. 2, a gate insulating film 4 is formed so as to cover the gate lines 1, the common line 2, and the common electrodes 3.

The source line 9 is provided so as to cross the gate line 1 at right angles. In the vicinity of the intersection of the gate line 1 and the source line 9, the gate line 1 is provided with a TFT 8 which is connected with the source line 9. The TFT 8 is connected with a pixel electrode 10 as well, and voltage applied to the gate line 1 and the source line 9 is transmitted via the TFT 8 to the pixel electrode 10.

Referring to FIGS. 1 and 2 again, the following explanation describes a manufacturing method of the liquid crystal display panel of the present embodiment.

After a Ta film has been formed by using a sputtering device on the substrate 20 which is to be formed as the base of the active matrix substrate 12, the Ta film is patterned by using a dry etching or wet etching method so as to form the gate lines 1, the common line 2, and the common electrodes 3 which branch out from the common line 2, on the same surface of the substrate 20. Additionally, in the present invention, the common line 2 and the common electrodes 3 correspond to the common-use electrode.

Next, on the surface of the substrate 20 on which the gate lines 1, the common line 2, and the common electrodes 3 have been formed, a SiNx film is formed by using a plasma CVD (chemical vapor deposition)method. The SiNx film is patterned so as to form the gate insulating film 4. Namely, the gate insulating film 4 is formed so as to cover the gate lines 1, the common line 2, and the common electrodes 3.

And then, after a Si film has been formed on the gate insulating film 4 by using the plasma CVD method, a patterning operation is performed thereon so as to form an a—Si(amorphous silicon)layer 6 and a n⁺—Si layer 7, and consequently to achieve the TFT 8. Successively, Ti, which has been made into a film thereon by using the sputtering method, is patterned so as to provide the source line 9 extending in the direction orthogonal to the gate lines 1 and the common line 2, and further to provide the pixel electrode 10.

Next, another SiNx film is formed by using the plasma CVD method so as to form a protection film 11, an alignment film 30 is formed thereon by using a printing method, and then, an aligning operation is performed on the alignment film 30 by using a rubbing method so that the active-matrix substrate 12 is achieved.

Meanwhile, an opposing substrate 13, which is bonded to the active matrix substrate 12, is provided with a light-shielding film 14 and a color filter 15 on an insulating substrate 21, and the alignment film 30 which is produced in the above-mentioned process is further provided thereon so as to achieve the opposing substrate 13.

Finally, the active matrix substrate 12 is bonded to the opposing substrate 13, and liquid crystal 16 with positive dielectric constant anisotropy is sealed therebetween so as to achieve the liquid crystal display panel.

Material and manufacturing method for each film are not particularly limited. It is possible to make a choice appropriately among the sputtering method, the plasma CVD method, an anodic oxidation method, and others in accordance with a material, etc. of a film to be stacked.

Additionally, in the present embodiment, the common line 2 and the common electrodes 3 are formed on the substrate which is provided with the pixel electrode 10; however, the common line and the common electrodes are allowed to be formed on the opposing substrate 13 as well.

The following explanation describes more specifically the constructions of the pixel electrode 10 and the common electrodes 3. Here, the liquid crystal display panel is viewed from the opposing substrate 13 as long as no additional explanation is given.

As shown in FIG. 1, the pixel electrode 10 is connected with the source line 9 via the TFT 8 which is formed on the gate line 1. Further, the pixel electrode 10 includes two pairs of wires which branch out from two places thereof(junction is indicated by "a" in FIG. 1) above the common line 2, and which extend to each of the two gate lines 1 surrounding the pixel, in parallel with the source line 9 (vertically in FIG. 1). Each of these two pairs is provided virtually in parallel with the common electrode 3, which will be described later, and is disposed between the common electrodes 3 extending in the same direction.

Additionally, the pixel electrode 10 is further provided with a wire which extends in parallel with the gate line 1 above the common line 2, which will be described later. This wire allows the above-mentioned pairs of branching wires to be connected with each other.

Moreover, on the active-matrix substrate 12, the common line 2 is formed in parallel with the gate line 1 so as to cross the central portion of the pixel.

In the present embodiment, three pairs of the common electrodes 3 extend from the common line 2 in parallel with the source lines 9(vertically in FIG. 1). Further, as shown in FIG. 1, the common electrodes 3 are arranged in a state that two pairs of branching wires of the pixel electrode 10, which extend in parallel with the source lines 9, are disposed between the common electrodes 3.

An area, which is surrounded by the pixel electrode 10 and at least one of the common electrode 3 and the common line 2, that is, an area surrounded by the pixel electrode 10 and the common-use electrode, corresponds to a display section 17.

Here, each top portion of the pixel electrode 10 and the common electrodes 3 that faces the gate lines 1 is bent into a key shape (bent portion is indicated by "b" in FIG. 1) except for two common electrodes 3 disposed in the vicinity of the source line 9. Further, the bending direction in the upper part of the pixel is opposite to that in the lower part of the pixel. Here, the common line 2 divides the pixel into the upper and lower part. Namely, each top portion of the pixel electrode 10 and the common electrodes 3 that faces the gate lines 1 is bent to the left with regard to the gate lines 1 and in parallel with the gate lines 1. Furthermore, the bent top portions are arranged so as not to overlap one another.

Moreover, in a portion in which the pixel electrode 10 overlaps the common line 2, as indicated by "c" in FIG. 1, the pixel electrode 10 is formed so as to cover one end of the common line 2. Furthermore, (a)the display section 17 in which one end of the common line 2 is covered with the pixel electrode 10 and (b)the display section 17 in which the end of the common line 2 is exposed without being covered with the pixel electrode 10, are alternately arranged in the direction orthogonal to and in parallel with the gate lines 1.

In other words, in the present embodiment, the pixel electrode 10, the common line 2, and the common electrodes 3 are disposed so as to be virtually point-symmetrical with the center of the common line 2(center of the pixel) serving as an origin.

With regard to each display section 17 which is virtually rectangular, assuming that a side which is virtually in parallel with and the closest to the gate line 1 is a first side $S_1$, the other sides are referred to as a second side $S_2$, a third side $S_3$, and a fourth side $S_4$ in the clockwise direction with the first side $S_1$. serving as an origin. The pixel electrode 10, the common line 2, and the common electrode 3 are disposed in accordance with the above-mentioned arrangement so that in each display section 17 of the pixel, the first side $S_1$, and the second side $S_2$ are constituted by one of the pixel electrode 10 and the common-use electrode (the common line 2 and the common electrode 3), and the third side $S_3$ and the fourth side $S_4$ are constituted by the other of the pixel electrode 10 and the common-use electrode.

With the aforementioned arrangement, with regard to each display section 17 in the pixel, when voltage is applied, the first side $S_1$, has the same potential with the second side $S_2$, and the third side $S_3$ has the same potential with the fourth side $S_4$. However, the potential of the first side $S_1$ and the second side $S_2$ is different from that of the third side $S_3$ and the fourth side $S_4$. Consequently, in all display sections 17 of the pixel, the directions of electric lines of force 18, which appear on ends of the display sections 17 due to distortion of the electric fields, are inclined in the same direction as the pixel electrode 10 and the common electrodes 3. Therefore, it is possible to keep virtually even the initial aligning direction of liquid crystal molecules 19 and the inclining direction of the electric line of force 18 in the entire pixel. The electric line of force 18 appears between the pixel electrode 10 and the common-use electrode. Here, a broken line adjacent to the liquid crystal molecule 19 indicates the direction which is in parallel with the branching wires of the pixel electrode 10 and the common electrodes 3 which are disposed orthogonally to the common line 2.

Therefore, unlike the conventional arrangement, the present embodiment does not cause a difference between the inclining direction of the electric line of force and the initial aligning direction of the liquid crystal molecules, partially within the same pixel, especially on ends of the display section. Namely, the inclining directions of the electric lines of force 18 are set so as to be even within the same pixel, and the initial aligning directions of the liquid crystal molecules 19 are set so as to be the same as the inclining direction of the electric lines of force 18. With this arrangement, for example, when voltage is applied, the liquid crystal molecules 19 rotate to the right in the entire pixel in the liquid crystal display panel of the present embodiment; therefore, it becomes possible to considerably improve the display quality as compared with the conventional arrangement. Additionally, the state of a rotating liquid crystal molecule during the application of voltage will be described later.

As described above, the initial aligning angle of the liquid crystal molecule 19 is not particularly limited as long as the initial aligning angle is set in accordance with the inclining direction of the electric line of force 18 of the display section 17. For example, it is possible to obtain sufficient contrast in the case when the angle ranges between 0° to 45° in the clockwise direction in the FIG. 1 with regard to the branching wires of the pixel electrode 10 and the common electrode 3 which are disposed orthogonally to the common line 2. Here, the angle is set at 2° in the present embodiment.

The liquid crystal display panel of the present embodiment causes no disclination line, thereby preventing roughness and a reduction in brightness on the screen.

Further, as described above, the top portions of the pixel electrode 10 and the common electrodes 3 are bent into a key shape to the left with regard to the gate lines 1 and in parallel with the gate lines 1 so that the electric field caused by the gate lines 1 is shielded by the bent portions of the pixel electrode 10 and the common electrodes 3. Hence, it is possible to reduce the influence of the electric field caused by the gate lines 1 in each display section 17. Furthermore, the bent top portions are arranged so as not to overlap one another; thus, it is possible to prevent leakage from occurring between the pixel electrode 10 and the common electrodes 3. Additionally, in some cases, as shown in FIG. 1, it is possible to omit the bent portions of the common electrodes 3 and the bent portions of the pixel electrode 10 that are indicated by hatched portions(namely, the first side $S_1$, of the display section 17).

Furthermore, in the present embodiment, the gate lines 1 and the common line 2 are formed on the same surface. The common line 2 is formed so as to virtually pass the center of the pixel in parallel with the gate line 1. Therefore, the gate lines 1 and the common line 2 are patterned with a sufficient distance so that it becomes possible to practically eliminate leakage occurring therebetween. The common electrodes 3 and the gate lines 1 are partially close to each other; however, the adjacent portions (the bent portions of the common electrodes 3 that extend in parallel with the gate lines 1) are short in length; therefore, the possibility of causing leakage is small. Even if any leakage occurs, it is possible to easily correct the leakage by cutting a part of the common electrode 3 with laser irradiation; therefore, it becomes possible to prevent a reduction in the rate of the non-defective products.

EMBODIMENT 2

Referring to a figure, the following explanation describes the second embodiment of the present invention.

Here, the liquid crystal display panel is viewed from the opposing substrate as long as no additional explanation is given.

Figure 3:
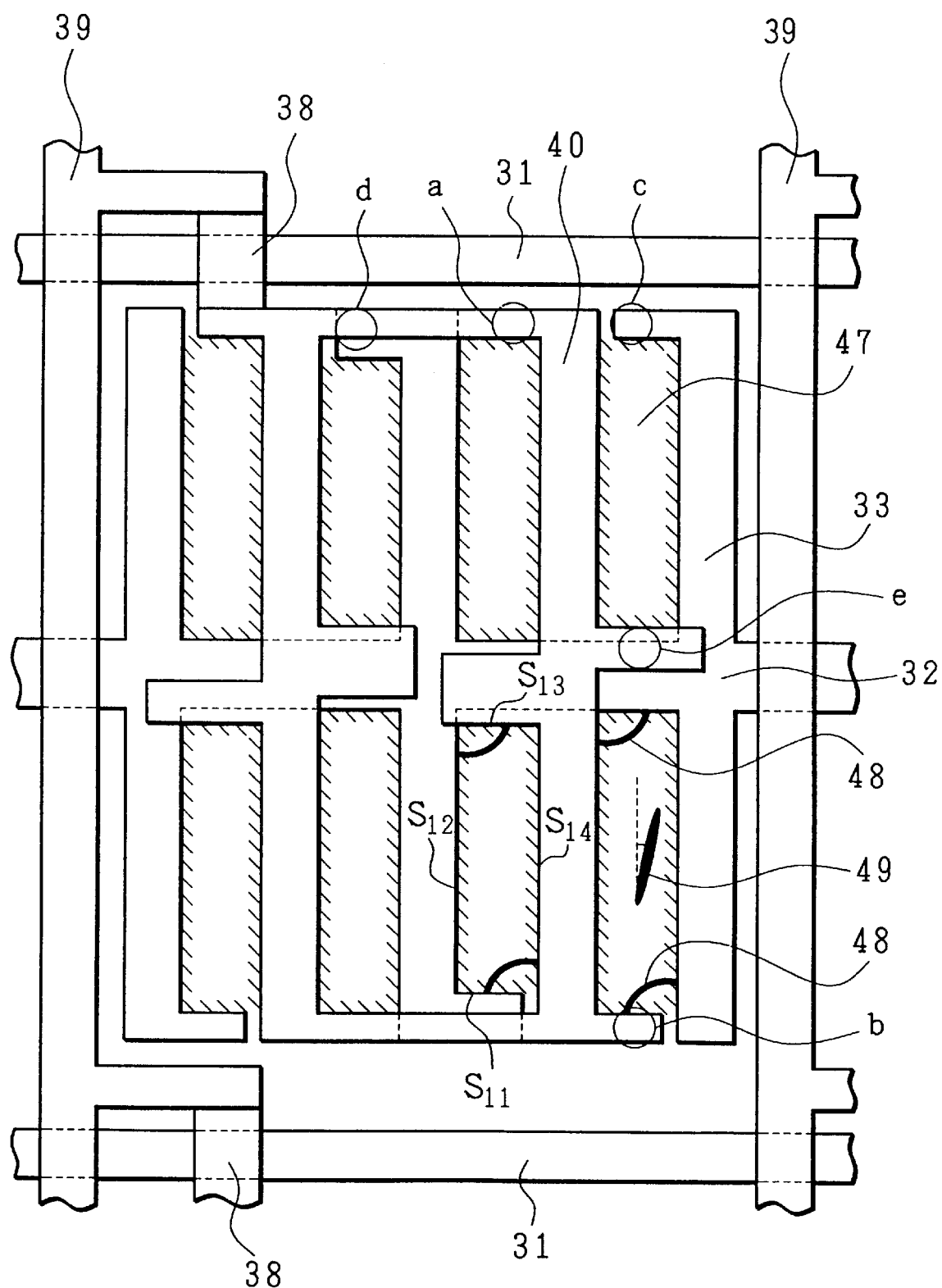
FIG. 3 is a top view showing another embodiment of the pixel of t liquid crystal display panel in accordance with the present invention.

FIG. 3 is a top view of one pixel in accordance with the present embodiment.

The present embodiment differs from Embodiment 1 mainly in the relative arrangements of the pixel electrode and the common electrode. Further, the shape of the pixel electrode is changed. Two wires of the pixel electrode extend in parallel with the source line so as to be connected with each other in the vicinity of the gate line. Further, in FIG. 3, an area, which is surrounded by a pair of gate lines 31 and a pair of source lines 39, corresponds to one pixel.

The following explanation describes in detail the liquid crystal display panel of the present embodiment.

A pixel electrode 40 is connected with the source line 39 via a TFT 38 which is formed on the gate line 31. The pixel electrode 40 has a construction in which two wires are arranged in parallel with the source line 39 in the pixel, each of the two wires has a branching wire that extends to the left to the gate line 31 in parallel there with, in the vicinity of the gate line 31 (to the left in FIG. 3), and the two wires are connected with each other as indicated by "a" in FIG. 3. Moreover, the pixel electrode 40 further includes two wires which branch out above a common line (main wire) 32 and which extend in parallel with the gate line 31.

The common line 32 of the present embodiment has the same arrangement as Embodiment 1. Three pairs of common electrodes(sub wire)33 extend from the common line 32 in parallel with the source line 39(vertically in FIG. 3). Further, as shown in FIG. 1, the common electrodes 33 are arranged in a manner so as to sandwich the pixel electrodes 40 extending in parallel with the source line 39.

An area, which is surrounded by the pixel electrode 40 and at least one of the common electrode 33 and the common line 32, in other words, an area which is surrounded by the pixel electrode 40 and the common-use electrode, corresponds to a display section 47.

Furthermore, a portion of the pixel electrode 40 that is adjacent to the gate line 31 is bent so as to form a projected portion(indicated by "b" in FIG. 3), and each top portion of the common electrodes 33, that is adjacent to the gate line 31, is bent in a key shape(indicated by "c" in FIG. 3) except for two common electrodes 33 disposed in the vicinity of the source line 39. Moreover, the bending direction in the upper part of the pixel is opposite to that of the lower part of the pixel. The common line 32 divides the pixel into the upper and lower part. Namely, each top portion of the pixel electrodes 40 and the common electrodes 33, that faces the gate line 31, is bent into a key shape to the left with regard to the gate line 31 and in parallel with the gate line 31.

Further, the portions of the pixel electrode 40 that are adjacent to the gate line 31 cover the portions of a pair of common electrodes 33 that are bent into a key shape. The pair of the common electrodes 33 branch out from the central portion of the common line 32. Here, the portions of the common electrodes 33 that are bent into a key shape are overlapped by the pixel electrode 40 in a manner so as to be offset toward the display section 47("d" in FIG. 3 shows a state in which the pixel electrode 40 overlaps the key-shaped portion of the common electrode 33).

Furthermore, with regard to the portions in which the branching wires of the pixel electrode 40 overlap the common line 32, as indicated by "e" in FIG. 3, the branching wire covers one end of the common line 32. Moreover, (a)the display section 47 in which one end of the common line 32 is covered with the pixel electrode 40 and (b)the display section 47 in which the end of the common line 32 is exposed without being covered with the pixel electrode 40, are alternately arranged in the direction orthogonal to and in parallel with the gate line 31.

In other words, in the present embodiment, the pixel electrode 40, the common line 32, and the common electrodes 33 are disposed so as to be virtually point-symmetrical with the center of the common line 32(center of the pixel) serving as an origin.

With regard to each display section 47 which is virtually rectangular, assuming that a side which is virtually in parallel with and the closest to the gate line 31 is a first side $S_{11}$, the other sides are referred to as a second side $S_{12}$, a third side $S_{13}$, and a fourth side $S_{14}$ in the clockwise direction with the first side $S_{11}$ serving as an origin. The pixel electrode 40, the common line 32, and the common electrode 33 are disposed in accordance with the above-mentioned arrangement so that in each display section 47 of the pixel, the first side $S_{11}$ and the second side $S_{12}$ are constituted by one of the pixel electrode 40 and the common-use electrode(the common line 32 and the common electrode 33), and the third side $S_{13}$ and the fourth side $S_{14}$ are constituted by the other.

With the aforementioned arrangement, with regard to each display section 47 of the pixel, when voltage is applied, the first side $S_{11}$ has the same potential with the second side $S_{12}$, and the third side $S_{13}$ has the same potential with the fourth side $S_{14}$. However, the potential of the first side $S_{1}1$ and the second side $S_{12}$ is different from that of the third side $S_{13}$ and the fourth side $S_{14}$. Consequently, in the same manner as Embodiment 1, in all display sections 47 of the pixel, the directions of electric lines of force 48, which appear between the pixel electrode 40 and the common-use electrodes, are inclined in the same direction as the pixel electrode 40 and the common electrodes 33. Therefore, the following effect can be obtained.

Namely, as shown in FIG. 3, in the case when the initial aligning angle of a liquid crystal molecule 49 is arranged in the same direction as the direction of the electric lines of force 48 inclined by the distortion of the electric field appearing on ends of the display section 47, the liquid crystal molecules 49 rotate to the right in the entire pixel when voltage is applied. Thus, it is possible to achieve a liquid crystal display panel with high display quality without causing any disclination line, roughness and a reduction in brightness on the screen. Here, a broken line adjacent to the liquid crystal molecule 49 indicates the direction in parallel with the branching wires of the pixel electrode 40 and the common electrodes 33, which are arranged orthogonally to the common line 32.

In the same manner as Embodiment 1, it is possible to obtain sufficient contrast in the case when the initial aligning angle of the liquid crystal molecule 49 ranges between 0° to 45° in the clockwise direction in the Figure with regard to the wires of the pixel electrode 40 and the common electrode 33, which are disposed orthogonally to the common line 32. Here, the angle is set at 2° in the present embodiment.

As described above, the liquid crystal display panel of the present embodiment is arranged so as to achieve the even directions of the electric lines of force 48 which appear due to distortion of the electric field, and to set the initial aligning angle of the liquid crystal molecule 49 in accordance with the inclining direction of the electric line of force 48; thus, the liquid crystal molecules 49 rotate to the right in the entire pixel when voltage is applied. Consequently, this arrangement does not cause any disclination line, roughness, and a reduction in brightness on the screen.

Furthermore, like Embodiment 1, in the present embodiment, the gate lines 31 and the common line 32 are formed on the same surface. The common line 32 is formed so as to virtually pass the center of the pixel in parallel with the gate lines 31. Therefore, the gate lines 31 and the common line 32 are patterned with a sufficient distance so that it becomes possible to practically eliminate leakage occurring therebetween. The common electrodes 33 and the gate lines 31 are partially close to each other; however, the adjacent portions (the bent portions of the common electrodes 33 that extend in parallel with the gate lines 31) are short in length; therefore, the possibility of causing leakage is small. Even if leakage occurs, it is possible to easily correct the leakage by cutting a part of the common electrode 33 with laser irradiation.

Moreover, unlike Embodiment 1, the present embodiment is arranged so that in the vicinity of the gate line 31, the wires of pixel electrode 40 virtually parallel with source line 39 are bent so as to connect with each other. Consequently, for example, even if the pixel electrode 40 is partially disconnected, the pixel electrode 40 is still electrically connected; thus, it is possible to prevent any defects from appearing in the pixel. Furthermore, the display sections 47 surrounded by the pixel electrode 40 are completely shielded from the electric field appearing from the gate lines 31.

However, since the common electrodes 33 and the pixel electrodes 40 partially overlap in the vicinity of the gate line 31, leakage may occur therebetween. Portions of the pixel electrode 40 or the common electrodes 33 that cause leakage can be cut by using laser irradiation, etc. so that it is possible to correct the leakage and to prevent a reduction in the rate of the non-defective products.

EMBODIMENT 3

Referring to a figure, the following explanation describes the third embodiment of the present invention.

Here, the liquid crystal display panel is viewed from the opposing substrate as long as no additional explanation is given.

Figure 4:
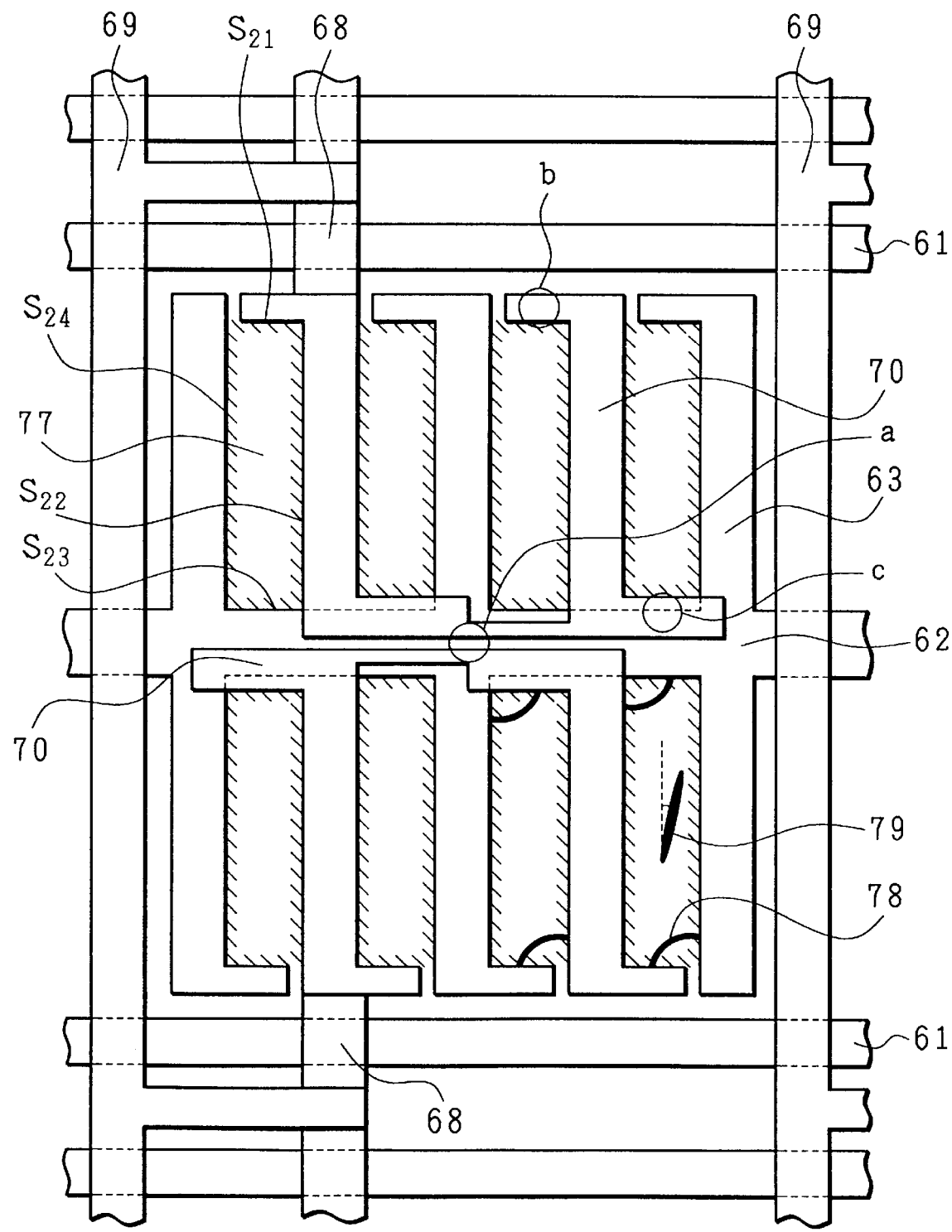
FIG. 4 is a top view showing still another embodiment of the pixel of the liquid crystal display panel in accordance with the present invention.

FIG. 4 is a top view of one pixel in accordance with the present embodiment.

The present embodiment differs from Embodiment 1 mainly in the relative arrangement of the pixel electrode and the common electrodes. Further, two pixel electrodes are arranged within one pixel. Moreover, in FIG. 4, an area, which is surrounded by a pair of gate lines 61 and a pair of source lines 69, corresponds to one pixel.

The following explanation describes in detail the liquid crystal display panel of the present embodiment.

In the liquid crystal display panel of the present embodiment, two pixel electrodes 70 are disposed in an area corresponding to one pixel so as to be virtually point-symmetrical with the central portion of a common line 62(main wire) serving as an origin, and each of the pixel electrodes 70 is connected with the source line 69 via a TFT 68 formed on the each of the gate lines 61. Each of the pixel electrodes 70 includes two wires which extend in parallel with the source line 69. The two wires overlap the common line 62 in a state in which the two wires are bent to each other virtually in parallel with the common line 62 so as to connect with each other, as indicated by "a" of FIG. 4.

The common line 62 of the present embodiment has the same arrangement as Embodiment 1. Three pairs of common electrodes(sub wire)63 extend from the common line 62 in parallel with the source line 69(vertically in FIG. 4). Further, as shown in FIG. 4, the common electrodes 63 are arranged in a state in which two pairs of wires branching out from the pixel electrodes 70 in parallel with the source line 69 are disposed between the common electrodes 63.

An area, which is surrounded by the pixel electrode 70 and at least one of the common electrode 63 and the common line 62, in other words, an area which is surrounded by the pixel electrode 70 and the common-use electrode corresponds to a display section 77.

Here, each top portion of the pixel electrodes 70 and the common electrodes 63, that faces the gate line 61, is bent into a key shape(bent portion is indicated by "b" in FIG. 4) except for two common electrodes 63 adjacent to the source line 69. Moreover, the bending direction in the upper part of the pixel is opposite to that in the lower part of the pixel. Here, the common line 62 divides the pixel into the upper and lower part. Namely, each top portion of the pixel electrodes 70 and the common electrodes 63, that faces the gate line 61, is bent into a key shape to the left with regard to the gate line 61 and in parallel with the gate line 61. Furthermore, these bent top portions are alternately disposed so as not to overlap one another.

Furthermore, with regard to the portions in which the branching wires of the pixel electrodes 70 overlap the common line 62, as indicated by "c" in FIG. 4, the pixel electrodes 70 form branching wires so as to cover one end of the common line 62. Moreover, (a)the display section 77 in which one end of the common line 62 is covered with the wire of the pixel electrode 70 and (b)the display section 77 in which the end of the common line 62 is exposed without being covered with the wire of the pixel electrode 70, are alternately arranged in the direction orthogonal to and in parallel with the gate lines 61.

Namely, in the present embodiment, the pixel electrodes 70, the common line 62, and the common electrodes 63 are disposed so as to be virtually point-symmetrical with the center of the common line 62(center of the pixel) serving as an origin.

With regard to each display section 77 which is virtually rectangular, assuming that a side which is virtually in parallel with and the closest to the gate line 61 is a first side $S_{21}$, the other sides are referred to as a second side $S_{22}$, a third side $S_{23}$, and a fourth side $S_{24}$ in the clockwise direction with the first side $S_{21}$ serving as an origin. The pixel electrode 70, the common line 62, and the common electrode 63 are disposed in accordance with the above-mentioned arrangement so that in each display section 77 of the pixel, the first side $S_{21}$ and the second side $S_{22}$ are constituted by one of the pixel electrode 70 and the common-use electrode(the common line 62 and the common electrode 63), and the third side $S_{23}$ and the fourth side $S_{24}$ are constituted by the other.

Next, a model of FIG. 4 shows the direction of an electric line of force 78 which appears between the pixel electrode 70 and the common-use electrode.

As shown in FIG. 4, with regard to each display section 77 in the pixel, when voltage is applied, the first side $S_{21}$ has the same potential with the second side $S_{22}$, and the third side $S_{23}$ has the same potential with the fourth side $S_{24}$ However, the potential of the first side $S_{21}$ and the second side $S_{22}$ is different from that of the third side $S_{23}$ and the fourth side $S_{24}$. Consequently, in the same manner as Embodiments 1 and 2, in all display sections 77, the directions of electric lines of force 78, which appear on ends of the display sections 77 due to distortion of the electric fields, are inclined in the same direction as the pixel electrodes 70 and the common electrodes 63.

The initial aligning angle of a liquid crystal molecule 79 is set in accordance with the inclining direction of the electric lines of force 78 appearing on ends of the display section 77. It is possible to obtain sufficient contrast in the case when the initial aligning angle of the liquid crystal molecule 79 ranges between 0° to 45° in the clockwise direction in the Figure with regard to the wires of the pixel electrodes 70 and the common electrodes 63, which are disposed orthogonally to the common line 62. Here, the angle is set at 2° in the present embodiment. Additionally, a broken line adjacent to the liquid crystal molecule 79 indicates the direction in parallel with the wires of the pixel electrodes 70 and the common electrodes 63, which are disposed orthogonally to the common line 62.

As described above, the liquid crystal display panel of the present embodiment is also arranged so as to achieve the even directions of the electric lines of force 78 which appear due to distortion of the electric field, and to set the initial aligning angle of the liquid crystal molecules 79 in accordance with the inclining direction of the electric lines force 78; thus, upon application of voltage, the liquid crystal molecules 79 rotate to the right in the entire pixel. Consequently, this arrangement does not cause any disclination line, roughness, and a reduction in brightness on the screen.

Further, like Embodiment 1, the present embodiment has a construction in which the gate lines 61 and the common line 62 are arranged with a sufficient distance, thus, it becomes possible to practically eliminate leakage. The common electrodes 63 and the gate lines 61 are partially close to each other; however, the adjacent portions (bent portions of the common electrodes 63 that extend in parallel with the gate lines 61) are short in length; therefore, the possibility of causing leakage is small. Even if leakage occurs, it is possible to easily correct the leakage by cutting a part of the common electrode 63 with laser irradiation.

It is possible to assume that the pixel electrode 70 of the present embodiment has the same construction as Embodiment 1, if, in Embodiment 1, a part of the pixel electrode 10 that overlaps the common line 62 is divided into two with a division line, which is arranged in parallel with the common line 62. The above-mentioned arrangement makes it possible to reduce an area in which the pixel electrodes and the common line overlap one another; therefore, leakage can be reduced between the pixel electrode and the common line as compared with the arrangement of Embodiment 1.

EMBODIMENT 4

Referring to a figure, the following explanation describes the fourth embodiment of the present invention.

Here, a liquid crystal display panel is viewed from the opposing substrate as long as no additional explanation is given.

Figure 5:
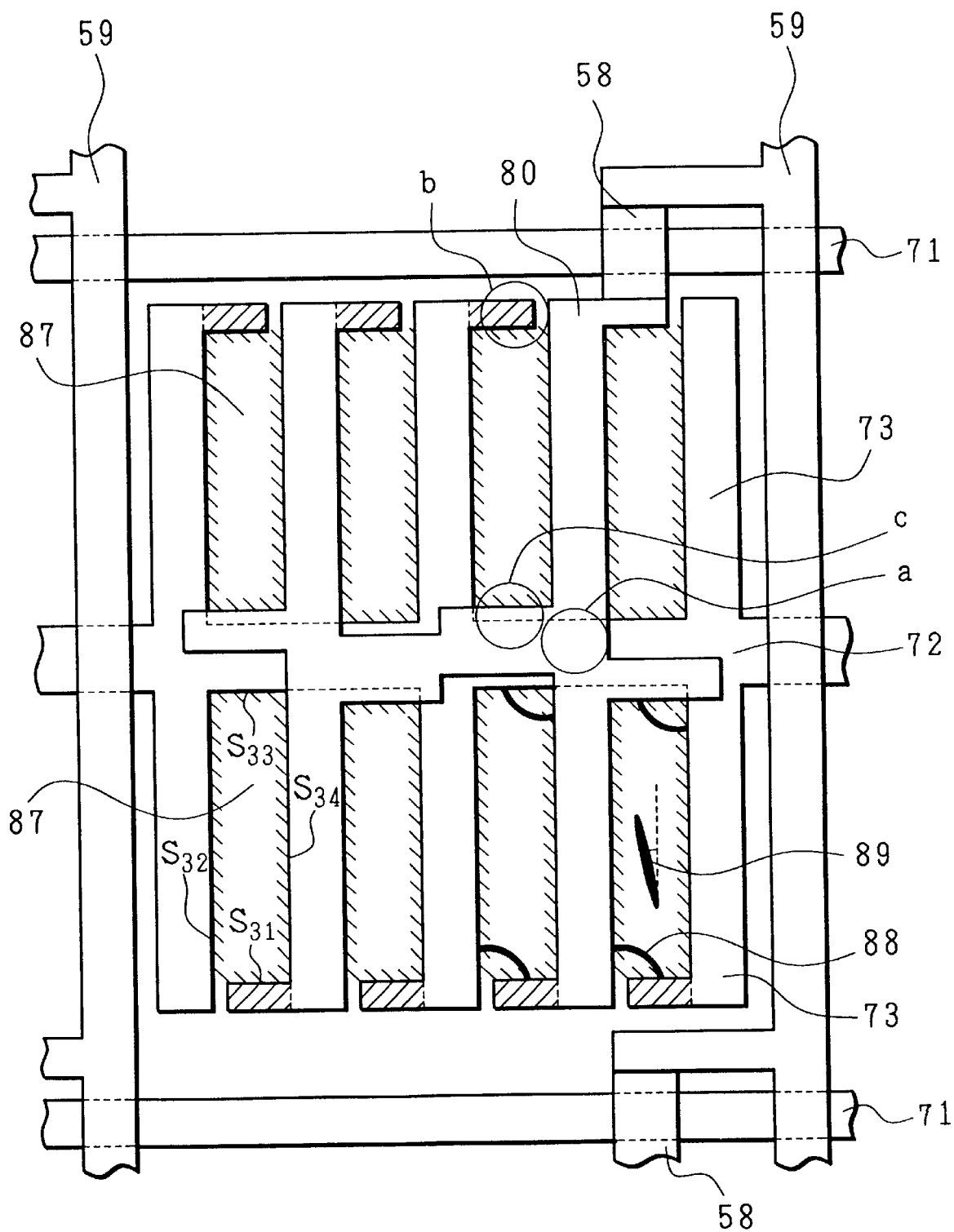
FIG. 5 is a top view showing still another embodiment of the pixel of the liquid crystal display panel in accordance with the present invention.

FIG. 5 is a top view of one pixel in accordance with the present embodiment.

The present embodiment differs from Embodiment 1 mainly in the arrangement of the pixel electrode and the common electrode. The arrangement of the pixel electrode 80 and the common electrode 73 of the present embodiment corresponds to an mirror image of the pixel electrode 10 and the common electrode 3 of the Embodiment 1. Further, in FIG. 5, an area, which is surrounded by a pair of gate lines 71 and a pair of source lines 59, corresponds to one pixel.

The following explanation describes in detail the liquid crystal display panel of the present embodiment.

As shown in FIG. 5, the pixel electrode 80 is connected with the source line 59 via the TFT 58 which is formed on the gate line 71. Further, the pixel electrode 80 includes two pairs of wires which branch out from two places thereof (junction is indicated by "a" in FIG. 5) above the common line (main wire) 72, and which extend in parallel with the source line 59 (vertically in FIG. 5) to each of the two gate lines 71 arranged on ends of the pixel. Each of these two pairs is placed virtually in parallel with the common electrode 73, which will be described later, and is disposed between the common electrodes 73 extending in the same direction.

Additionally, the pixel electrode 80 is further provided with wires which extend in parallel with the gate line 71 above the common line 72, which will be described later. This wire allows the above-mentioned two pairs of branching wires to be connected with each other.

In the present embodiment, the common line 72 is formed in parallel with the gate line 71 so as to cross the central portion of the pixel. Three pairs of the common electrodes 73 extend from the common line 72 in parallel with the source lines 59 (vertically in FIG. 5). Further, as shown in FIG. 5, the common electrodes 73 are arranged in a state that two pairs of branching wires of the pixel electrode 80, that extend in parallel with the source lines 59, are disposed between the common electrodes 73.

An area, which is surrounded by the pixel electrode 80, and at least one of the common electrode 73 and the common line 72, that is, an area surrounded by the pixel electrode 80 and the common-use electrode corresponds to a display section 87.

Here, each top portion of the pixel electrodes 80 and the common electrodes 73 that faces the gate lines 71 is bent into a key shape(bent portion is indicated by "b" in FIG. 5) except for two common electrodes 73 disposed in the vicinity of the source line 59. Further, the bending direction in the upper part of the pixel is opposite to that in the lower part of the pixel. Here, the common line 72 divides the pixel into the upper and lower part. Namely, each top portion of the pixel electrode 80 and the common electrodes 73 that faces the gate lines 71 is bent to the right with regard to the gate lines 71 and in parallel with the gate lines 71. Furthermore, the bent top portions are arranged so as not to overlap one another.

Moreover, in a portion in which the pixel electrode 80 overlaps the common line 72, as indicated by "c" in FIG. 5, the pixel electrode 80 is formed so as to cover one end of the common line 72. Furthermore, (a)the display section 87 in which one end of the common line 72 is covered with the pixel electrode 80 and (b)the display section 87 in which the end of the common line 72 is exposed without being covered with the pixel electrode 80, are alternately arranged in the direction orthogonal to and in parallel with the gate lines 71.

In other words, in the present embodiment, the pixel electrode 80, the common line 72, and the common electrodes 73 are disposed so as to be virtually point-symmetrical, with the center of the common line 72(center of the pixel) serving as an origin.

With regard to each display section 87 which is virtually rectangular, assuming that a side which is virtually in parallel with and the closest to the gate line 71 is a first side $S_{31}$, the other sides are referred to as a second side $S_{32}$, a third side $S_{33}$, and a fourth side $S_{34}$, in the clockwise direction with the first side $S_{31}$ serving as an origin. The pixel electrode 80, the common line 72, and the common electrode 73 are disposed in accordance with the above-mentioned arrangement so that in each display section 87 of the pixel, the second side $S_{32}$ and the third side $S_{33}$ are constituted by one of the pixel electrode 80 and the common-use electrode(the common line 72 and the common electrode 73), and the fourth side $S_{34}$ and the first side $S_{31}$ are constituted by the other.

With the aforementioned arrangement, with regard to each display section 87 of the pixel, when voltage is applied, the second side $S_{32}$ has the same potential with the third side $S_{33}$, and the fourth side $S_{34}$ has the same potential with the first side $S_{31}$. However, the potential of the second side $S_{32}$ and the third side $S_{33}$ is different from that of the fourth side $S_{34}$ and the first side $S_{31}$. Consequently, in each display section 87, the direction of an electric line of force 88, which appears on ends of the display section 87 due to distortion of the electric field, is inclined in the same direction as the pixel electrode 80 and the common electrode 73. Therefore, it is possible to keep virtually even the initial aligning direction of liquid crystal molecules 89 and the inclining direction of the electric lines of force 88 in the entire pixel. The electric lines of force 88 appear between the pixel electrode 80 and the common-use electrode. Here, a broken line adjacent to the liquid crystal molecule 89 indicates the direction which is in parallel with the wires of the pixel electrode 80 and the common electrodes 73 which are disposed orthogonally to the common line 72.

Therefore, unlike the conventional arrangement, the present embodiment does not cause a difference between the inclining direction of the electric line of force and the initial aligning direction, partially within the same pixel, especially on ends of the display section. Namely, the inclining directions of the electric lines of force 88 are set so as to be even within the same pixel, and the initial aligning directions of the liquid crystal molecules 89 are set so as to be the same as the inclining direction of the electric lines of force 88. With this arrangement, for example, when voltage is applied, the liquid crystal molecules 89 rotate to the left in the entire pixel of the liquid crystal display panel of the present embodiment; therefore, it becomes possible to considerably improve the display quality as compared with the conventional arrangement. Additionally, the state of a rotating liquid crystal molecule during the application of voltage will be described later.

As described above, the initial aligning angle of the liquid crystal molecule 89 is not particularly limited as long as the initial aligning angle is set in accordance with the inclining direction of the electric line of force 88 of the display section 87. For example, it is possible to obtain sufficient contrast in the case when the angle ranges between 0° to 45° in the counterclockwise direction in the Figure with regard to the wires of the pixel electrode 80 and the common electrode 73, which are disposed orthogonally to the common line 72. Here, the angle is set at 2° in the present embodiment.

The liquid crystal display panel of the present embodiment causes no disclination line, thereby preventing roughness and a reduction in brightness on the screen.

Further, as described above, the top portions of the pixel electrodes 80 and the common electrodes 73 are bent into a key shape to the right with regard to the gate lines 71 and in parallel with the gate lines 71 so that the electric field caused by the gate lines 71 is shielded by the bent portions of the pixel electrodes 80 and the common electrodes 73. Hence, in each display section 87, it is possible to reduce the influence of the electric field caused by the gate lines 71. Furthermore, the bent top portions are arranged so as not to overlap one another; thus, it is possible to prevent leakage from occurring between the pixel electrode 80 and the common electrode 73. Additionally, in some cases, as shown in FIG. 5, it is possible to omit the bent portions of the common electrodes 73 and the bent portions of the pixel electrode 80 that are indicated by hatched portions(namely, the first side $S_{31}$ of the display section 87).

Furthermore, in the present embodiment, the gate lines 71 and the common line 72 are formed on the same surface. The common line 72 is formed so as to virtually pass the center of the pixel in parallel with the gate lines 71. Therefore, the gate lines 71 and the common line 72 are patterned with a sufficient distance so that it becomes possible to practically eliminate leakage therebetween. The common electrodes 73 and the gate lines 71 are partially close to each other; however, the adjacent portions (the bent portions of the common electrodes 73 that extend in parallel with the gate lines 71) are short in length; therefore, the possibility of causing leakage is small. Even if any leakage occurs, it is possible to easily correct the leakage by cutting a part of the common electrode 73 with laser irradiation; therefore, it becomes possible to prevent a reduction in the rate of the non-defective products.

Figure 6:
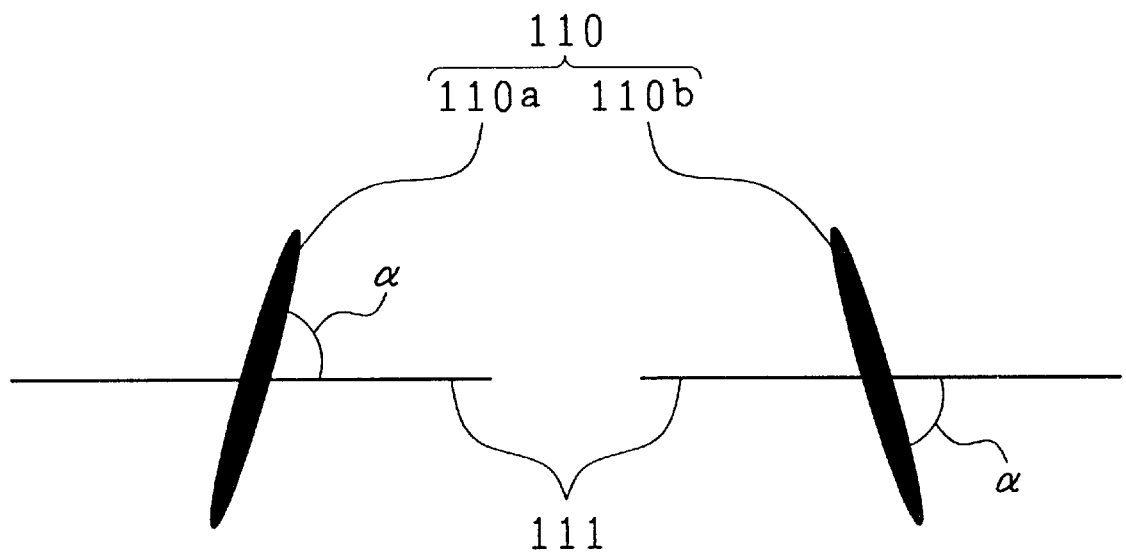
FIGS. 6(a) and 6(b) are models showing a relationship between a liquid crystal molecule and an electric line of force.
Figure 6:
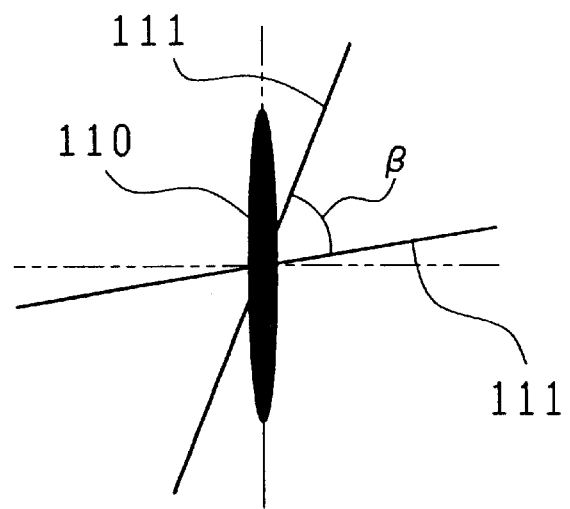
Figure 7:
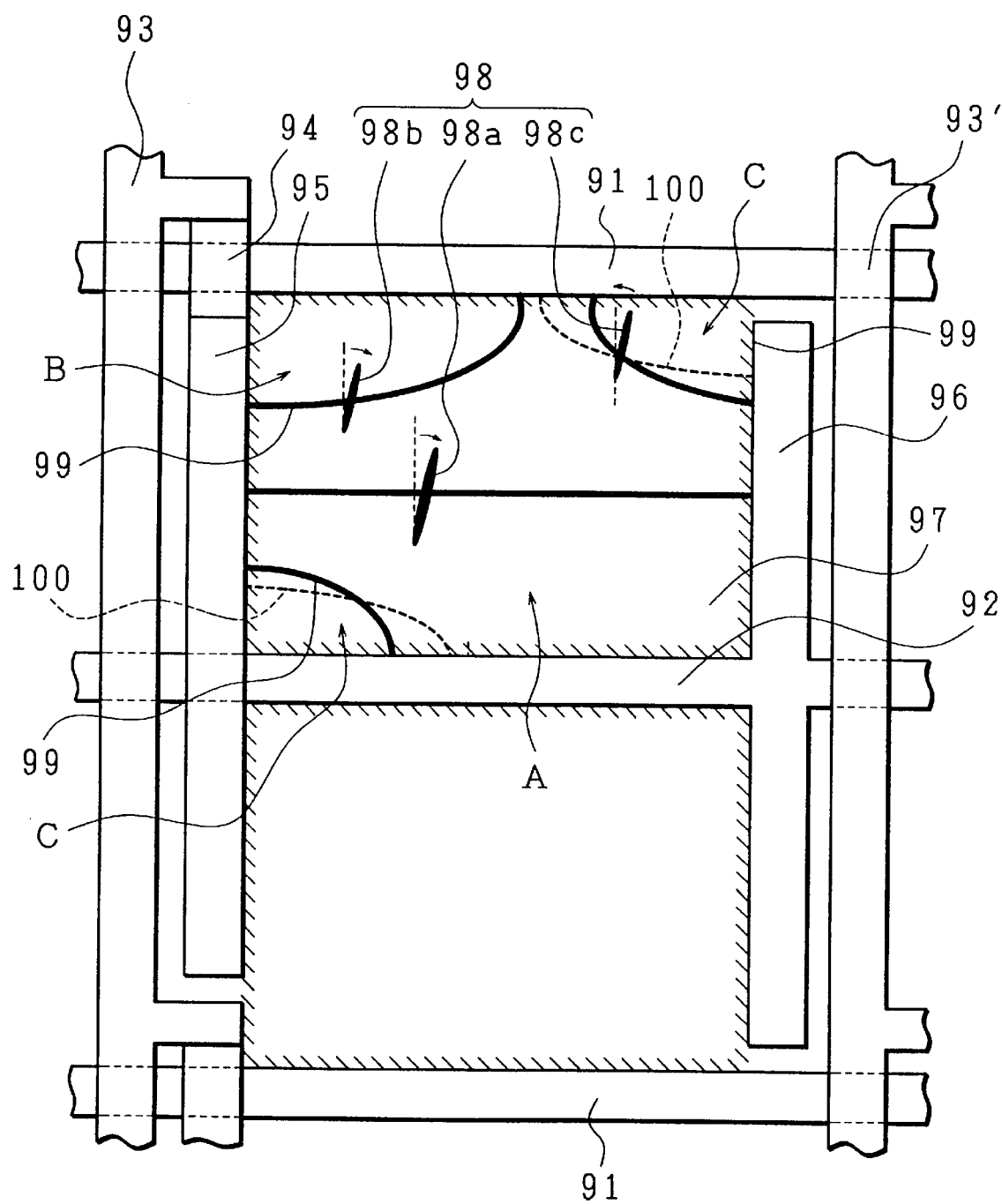
FIG. 7 is a top view showing the pixel of a conventional liquid crystal display panel.

As described above, with regard to the arrangement of the liquid crystal display panel which drives with horizontal electric field, it is necessary to consider the direction of the electric lines of force of the entire display section as well as the entire pixel. Referring to FIGS. 6(a) and 6(b), the detailed explanation will be given on the relationship between the liquid crystal molecule and the electric line of force, for preventing reverse twist.

For example, in the case when a liquid crystal molecule 110 has positive dielectric constant anisotropy, torque is exerted on the smaller side of the angles formed by the major axis and an electric line of force 111. Namely, in FIG. 6(a), in the case when an angle α formed by the major axis and the electric line of force 111(Here, for convenience, the absolute value of the angle α is set at between 020 and 90° among angles formed by the major axis of the liquid crystal molecule and the electric line of force in FIG. 6(a), further, from the major axis of the liquid crystal molecule, the clockwise direction side has positive polarity and the counterclockwise direction side has negative polarity) is set at 0°<α<90°, the liquid crystal molecule 110 rotates clockwise in FIG. 6(a). In the case when the angle α is set at −90°<α<0°, the liquid crystal molecule 110 rotates counterclockwise in FIG. 6(a). Further, when the angle α is at 0°, 90°, and −90°, the liquid crystal molecule 110 does not rotate. Therefore, in FIG. 6(a), a liquid crystal molecule 110a rotates clockwise and a liquid crystal molecule 110b rotates counterclockwise.

Hence, the range of the angle α, which is formed by each electric line of force and each liquid crystal molecule in the display section, is kept at either 0°≦α<90° or −90°<α≦0° so that it is possible to achieve the even rotating directions of liquid crystal molecules in the display section. Furthermore, in all display sections on the liquid crystal display panel, the angles α are set at one of the above-mentioned ranges so that it is possible to keep the rotating direction of all liquid crystal molecules the same in the liquid crystal display panel.

Moreover, as shown in FIG. 6(b), in order to keep the width of distribution of the angle α, that is formed by the electric line of force and the liquid crystal molecule at either 0°≦α<90° or −90°<α≦0° in the display section, it is necessary to set the width of distribution of an angle which is formed by the tangents of the electric line of force 111, namely, the largest open angle β of the tangents of the electric line of force 111 at less than 90° in the display section, and further to set the open angle β so as to include neither a major axis direction nor the minor axis direction of the liquid crystal molecule 110.

The positions of the pixel electrode and the common-use electrode are not particularly limited to the aforementioned embodiments as long as the display sections are formed on both sides of the common line and the inclining directions of the electric lines of force are kept even in the pixel. With regard to each display section which is virtually rectangular, it is assumed that a side which is virtually in parallel with and the closest to the gate line is a first side, the other sides are referred to as a second side, a third side, and a fourth side in the clockwise direction with the first side serving as an origin. In this case, the first side and the second side are constituted by one of the pixel electrode and the common-use electrode (the common line and the common electrode), and the third side and the fourth side are constituted by the other. Further, the following arrangement is also adopted: the second side and the third side are constituted by one of the pixel electrode and the common-use electrode(the common line and the common electrode), and the forth side and the first side are constituted by the other.

Furthermore, as described in the aforementioned embodiments, all sides of the display section are not necessarily surrounded by the pixel electrode or the common-use electrode; namely, the sides can be partially open. For example, it is possible to omit one side facing the gate line(namely, the first side). Even in the case when one side facing the gate line(the first side) is omitted, the remained sides are referred to as the second side, the third side, and the forth side in the same manner as the case when the display section is surrounded by all sides. Moreover, in the case when two sides of the display section are in parallel with the gate line and are disposed at the same distance from the gate lines, any one of the two sides can be referred to as the first side.

Moreover, in order to achieve even pattern formations of the electric lines of force formed in the display section, it is desirable to form each display section into a virtually identical shape.

Further, in order to easily and positively arrange the positions of the pixel electrode and the common-use electrode that allow the inclining directions of the electric lines of force in the pixel to be even, each electrode is point-symmetrically patterned so as not to have a symmetric axis with the center of each pixel virtually serving as an origin.

The liquid crystal display panel of the present invention is also allowed to be arranged as follows: the liquid crystal display panel using a horizontal electric field driving system, in which a liquid crystal layer is sandwiched between a pair of opposing substrates, a plurality of gate lines and a plurality of common lines are disposed virtually in parallel with each other between the pair of substrates, a plurality of source lines are disposed so as to cross the gate lines virtually at right angles, and a pixel is surrounded by the gate lines and the source lines, is characterized in that: the pixel is provided with an active element, a pixel electrode which is connected with the source line via the active element and has wires disposed in parallel with the source line, and the common electrodes which are disposed virtually in parallel with the pixel electrode and branch out from the common line so as to cross the common line virtually at right angles; an area surrounded by the pixel electrode and the common electrode or the common line is referred to as a display section; and the electric lines of force are generated so as to allow the rotating directions of liquid crystal molecules to be even in the pixel when voltage is applied.

With this arrangement, the area surrounded by the pixel electrodes and the common electrodes or the common line is referred to as the display section, and the pixel electrodes and the common electrode or the common line regulate the display sections so as to generate electric lines of force which allow the rotating directions of the liquid crystal molecules to be even in the pixel when voltage is applied; therefore, it is possible to reduce the unevenness of the aligning directions of the liquid crystal molecules, that has been conventionally caused by the uneven horizontal electric field. Consequently, this arrangement makes it possible to provide a liquid crystal display panel which prevents roughness and a reduction in the brightness on the screen.

Further, since the common electrodes branch out from the common line in two directions virtually orthogonal to the common line, it is possible to sufficiently expand the intervals between the common line and the gate lines, and consequently to prevent leakage from occurring between the common line and the gate lines.

The liquid crystal display panel of the present invention is also allowed to have a construction in which, with regard to at least one of the pixel electrode and the common electrodes, the top portions facing the gate lines are bent between the display section and the gate lines.

With this arrangement, with regard to at least one of the pixel electrode and the common electrodes, the top portions facing the gate line are bent between the display section and the gate line. Thus, it is possible to prevent the electric field generated by the gate line from causing the unevenness of the electric lines of force in the display section.

The liquid crystal panel of the present invention is also allowed to have a construction in which, with regard to at least one of the display sections which are adjacent to each other, the pixel electrode overlaps one end of the common line in a manner so as to be offset to the display section.

With this arrangement, with regard to at least one of the display sections which are adjacent to each other, the pixel electrode overlaps one end of the common line in a manner so as to be offset to the display section. Thus, it is possible to correct the distorted electric lines force to the same direction in the end portions of the display section that are adjacent to the common line.

The liquid crystal display panel of the present invention is also allowed to have a construction in which the common line divides one pixel into the upper part and the lower part, and the bending direction of the top portions in the upper part are opposite to that of the top portions in the lower part. This arrangement makes it possible to correct the distortion (inclination) of the electric lines of force to the same direction around the bent top portions of the pixel electrode and the common electrodes.

The liquid crystal display panel of the present invention is allowed to have a construction in which a width of distribution of an angle formed by the tangents of the electric line of force in the display section when voltage is applied, is set at less than 90°.

This arrangement makes it possible to set the initial aligning directions of the liquid crystal molecules so as to achieve the even rotating directions of the liquid crystal molecules in the display section when voltage is applied.

The liquid crystal display panel is also allowed to have a construction in which an angle, which is formed by the electric line of force and the initial aligning direction of the liquid crystal molecule when voltage is applied in the display section, is kept at less than 90°.

This arrangement makes it possible to achieve the even rotating directions of the liquid crystal molecules in the display section when voltage is applied, and consequently to prevent reverse twist from causing a disclination line.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display panel using a horizontal electric field driving system, in which a liquid crystal layer is sandwiched between a pair of opposing substrates, a plurality of gate lines and a plurality of source lines are disposed virtually orthogonal to one another between said pair of substrates, and a pixel is surrounded by the plurality of gate lines and the plurality of source lines, wherein said pixel comprises:

an active element, a pixel electrode which is connected with one of the plurality of source lines via said active element and has a wire disposed virtually in parallel with one of said plurality of source lines, and a common-use electrode which includes a main wire disposed virtually in parallel with said plurality of gate lines, and includes sub wires branching out from the main wire in two directions so as to be arranged virtually in parallel with the plurality of source lines, the main wire being arranged to extend through a central part of the pixel and virtually orthogonal to said plurality of source lines, and wherein an area surrounded by said pixel electrode and said common-use electrode serves as a display section, and said pixel electrode and said common-use electrode are arranged so as to generate electric lines of force which achieve an even rotating direction of a liquid crystal molecule in all display sections of the pixel when voltage is applied.

2. The liquid crystal display panel as defined in claim 1, wherein said display section is virtually rectangular, and assuming that a side which is virtually in parallel with and the closest to one of said plurality of gate lines is a first side, the other sides are referred to as a second side, a third side, and a fourth side in the clockwise direction with the first side serving as an origin, the first side and the second side are constituted by one of the pixel electrode and the common-use electrode and the third side and the fourth side are constituted by the other of the pixel electrode and the common-use electrode.

3. The liquid crystal display panel as defined in claim 1, wherein said display section is virtually rectangular, and assuming that a side which is virtually in parallel with and the closest to said one of the plurality of gate lines is a first side, the other sides are referred to as a second side, a third side, and a fourth side in the clockwise direction with the first side serving as an origin, the second side and the third side are constituted by one of the pixel electrode and the common-use electrode and the first side and the fourth side are constituted by the other of the pixel electrode and the common-use electrode.

4. The liquid crystal display panel as defined in claim 1, wherein said pixel electrode and said common-use electrode respectively include a plurality of portions which are virtually formed into an L-shape, each bent portion of said pixel electrode and each bent portion of said common-use electrode oppose to each other so as to form a plurality of virtually rectangular shapes which correspond to said display sections, and with regard to the respective display sections which are virtually rectangular, diagonal lines connecting the opposing bent portions are arranged in parallel with one another.

5. The liquid crystal display panel as defined in claim 1, wherein said pixel electrode and said common-use electrode overlap merely on said main wire of the common-use electrode.

6. The liquid crystal display panel as defined in claim 2, wherein said first side is omitted in at least one of the display sections facing the gate line.

7. The liquid crystal display panel as defined in claim 3, wherein said first side is omitted in at least one of the display sections facing the gate line.

8. The liquid crystal display panel as defined in claim 1, wherein each of said pixel electrode and said common-use electrode is point-symmetrically disposed with a virtually central portion of each pixel serving as an origin.

9. The liquid crystal display panel as defined in claim 1, wherein with regard to one of the display sections which are adjacent to each other, the pixel electrode disposed on the main wire of the common-use electrode protrudes from an end of the main wire toward the display section side.

10. The liquid crystal display panel as defined in claim 4, wherein the bent portion of the pixel electrode and the bent portion of the common-use electrode are alternately disposed in the direction virtually in parallel with the plurality of gate lines.

11. The liquid crystal display panel as defined in claim 1, wherein an angle formed by an electric line of force and an initial aligning direction of the liquid crystal molecule ranges from about 0° to less than about 90° when voltage is applied.

12. The liquid crystal display panel as defined in claim 1, wherein an angle formed by an electric line of force and an initial aligning direction of the liquid crystal molecule ranges from more than about−90° to about 0° when voltage is applied.

13. The liquid crystal display panel as defined in claim 2, wherein said first side of each display section is formed by bending the pixel electrode or the common-use electrode which constitute the second side.

14. The liquid crystal display panel as defined in claim 3, wherein said first side of each display section is formed by bending the pixel electrode or the common-use electrode which constitute the fourth side.

15. The liquid crystal display panel as defined in claim 8, wherein said pixel electrode is divided into two on said main wire.

16. The liquid crystal display panel as defined in claim 1, wherein said pixel electrode has at least two wires disposed virtually in parallel with said plurality of source lines and said pixel electrode is disposed so as to surround at least two display sections which are adjacent to each other in a virtually rectangular shape by interconnection of the at least two wires near the plurality of gate lines.

17. A liquid crystal display panel using a horizontal electric field driving system, in which a liquid crystal layer is sandwiched between a pair of opposing substrates, a plurality of gate lines and a plurality of common lines are disposed virtually in parallel with one another between said pair of substrates, a plurality of source lines are disposed virtually orthogonal to the plurality of gate lines, and a pixel is surrounded by the plurality of gate lines and the plurality of source lines, wherein said pixel comprises:

an active element, a pixel electrode which is connected with one of the plurality of source lines via said active element and has a wire disposed virtually in parallel with one of said plurality of source lines, and a common electrode which is disposed virtually in parallel with said pixel electrode and branches out from one of the plurality of common lines in two directions so as to cross one of said plurality of common lines virtually at right angles, the one of said plurality of common lines being arranged to extend through a central part of the pixel and virtually orthogonal to said source lines, and wherein an area surrounded by said pixel electrode and said common electrode or said common line serves as a display section, and said display sections generate an electric lines of force which achieve an even rotating direction of a liquid crystal molecule of the pixel when voltage is applied.

18. The liquid crystal display panel as defined in claim 17, wherein with regard to at least one of said pixel electrode and said common electrode, a top portion facing one of said plurality of gate lines is bent between said display section and one of said plurality of gate lines.

19. The liquid crystal display panel as defined in claim 17, wherein with regard to one of the display sections which are adjacent to each other, the pixel electrode overlaps one end of on of the plurality of common line in a manner so as to be offset to the display section.

20. The liquid crystal display panel as defined in claim 18, wherein a bending direction of said top portion is opposite to that of the other part of the pixel, one of said plurality of common lines serving as a boundary dividing the pixel.

21. The liquid crystal display panel as defined in claim 17, wherein the largest open angle of tangents of the electric line of force is set at less than 90° in said display section and further said open angle is set so as to include neither a major axis direction nor a minor axis direction of the liquid crystal molecule.

22. The liquid crystal display panel as defined in claim 17, wherein an angle formed by the electric line of force and an initial aligning direction of the liquid crystal molecule is set at less than 90° when voltage is applied.

23. A liquid crystal display panel using a horizontal electric field driving system, in which a liquid crystal layer is sandwiched between a pair of opposing substrates, a plurality of gate lines and a plurality of source lines are disposed virtually orthogonal to one another between said pair of substrates, and a pixel is surrounded by the plurality of gate lines and the plurality of source lines, wherein said pixel comprises:
   an active element,
   a pixel electrode which is connected with one of the plurality of source lines via said active element and has a wire disposed virtually in parallel with one of said plurality of source lines, and
   a common-use electrode which includes a main wire disposed virtually in parallel with said plurality of gate lines, and includes sub wires branching out from the main wire in two directions so as to be arranged virtually in parallel with the plurality of source lines,
   wherein an area surrounded by said pixel electrode and said common-use electrode serves as a display section, and said pixel electrode and said common-use electrode are arranged so as to generate electric lines of force which achieve an even rotating direction of a liquid crystal molecule in all display sections of the pixel when voltage is applied, and
   wherein said pixel electrode and said common-use electrode overlap merely on said main wire of the common-use electrode.

24. A liquid crystal display panel using a horizontal electric field driving system, in which a liquid crystal layer is sandwiched between a pair of opposing substrates, a plurality of gate lines and a plurality of source lines are disposed virtually orthogonal to one another between said pair of substrates, and a pixel is surrounded by the plurality of gate lines and the plurality of source lines, wherein said pixel comprises:
   an active element,
   a pixel electrode which is connected with one of the plurality of source lines via said active element and has a wire disposed virtually in parallel with one of said plurality of source lines, and
   a common-use electrode which includes a main wire disposed virtually in parallel with said plurality of gate lines, and includes sub wires branching out from the main wire in two directions so as to be arranged virtually in parallel with the plurality of source lines,
   wherein an area surrounded by said pixel electrode and said common-use electrode serves as a display section, and said pixel electrode and said common-use electrode are arranged so as to generate electric lines of force which achieve an even rotating direction of a liquid crystal molecule in all display sections of the pixel when voltage is applied,
   wherein said display section is virtually rectangular, and assuming that a side which is virtually in parallel with and the closest to one of said plurality of gate lines is a first side, the other sides are referred to as a second side, a third side, and a fourth side in the clockwise direction with the first side serving as an origin, the first side and the second side are constituted by one of the pixel electrode and the common-use electrode and the third side and the fourth side are constituted by the other of the pixel electrode and the common-use electrode,
   wherein said first side is omitted in at least one of the display sections facing the gate line.

25. A liquid crystal display panel using a horizontal electric field driving system, in which a liquid crystal layer is sandwiched between a pair of opposing substrates, a plurality of gate lines and a plurality of source lines are disposed virtually orthogonal to one another between said pair of substrates, and a pixel is surrounded by the plurality of gate lines and the plurality of source lines, wherein said pixel comprises:
   an active element,
   a pixel electrode which is connected with one of the plurality of source lines via said active element and has a wire disposed virtually in parallel with one of said plurality of source lines, and
   a common-use electrode which includes a main wire disposed virtually in parallel with said plurality of gate lines, and includes sub wires branching out from the main wire in two directions so as to be arranged virtually in parallel with the plurality of source lines,
   wherein an area surrounded by said pixel electrode and said comnmon-use electrode serves as a display section, and said pixel electrode and said common-use electrode are arranged so as to generate electric lines of force which achieve an even rotating direction of a liquid crystal molecule in all display sections of the pixel when voltage is applied,
   wherein said display section is virtually rectangular, and assuming that a side which is virtually in parallel with and the closest to one of said plurality of gate lines is a first side, the other sides are referred to as a second side, a third side, and a fourth side in the clockwise direction with the first side serving as an origin, the second side and the third side are constituted by one of the pixel electrode and the common-use electrode and the first side and the fourth side are constituted by the other of the pixel electrode and the common-use electrode,
   wherein said first side is omitted in at least one of the display sections facing the gate line.

26. A liquid crystal display panel using a horizontal electric field driving system, in which a liquid crystal layer is sandwiched between a pair of opposing substrates, a plurality of gate lines and a plurality of source lines are disposed virtually orthogonal to one another between said pair of substrates, and a pixel is surrounded by the plurality of gate lines and the plurality of source lines, wherein said pixel comprises:
   an active element,
   a pixel electrode which is connected with one of the plurality of source lines via said active element and has a wire disposed virtually in parallel with one of said plurality of source lines, and
   a common-use electrode which includes a main wire disposed virtually in parallel with said plurality of gate lines, and includes sub wires branching out from the main wire in two directions so as to be arranged virtually in parallel with the plurality of source lines, wherein an area surrounded by said pixel electrode and said common-use electrode serves as a display section, and said pixel electrode and said common-use electrode are arranged so as to generate electric lines of force which achieve an even rotating direction of a liquid crystal molecule in all display sections of the pixel when voltage is applied, wherein said display section is virtually rectangular, and assuming that a side which is virtually in parallel with and the closest to one of said plurality of gate lines is a first side, the other sides are referred to as a second side, a third side, and a fourth side in the clockwise direction with the first side serving as an origin, the first side and the second side are constituted by one of the pixel electrode and the common-use electrode and the third side and the fourth side are constituted by the other of the pixel electrode and the common-use electrode, wherein said first side of each display section is formed by bending the pixel electrode or the common-use electrode which constitute the second side.

27. A liquid crystal display panel using a horizontal electric field driving system, in which a liquid crystal layer is sandwiched between a pair of opposing substrates, a plurality of gate lines and a plurality of source lines are disposed virtually orthogonal to one another between said pair of substrates, and a pixel is surrounded by the plurality of gate lines and the plurality of source lines, wherein said pixel comprises:

an active element, a pixel electrode which is connected with one of the plurality of source lines via said active element and has a wire disposed virtually in parallel with one of said plurality of source lines, and a common-use electrode which includes a main wire disposed virtually in parallel with said plurality of gate lines, and includes sub wires branching out from the main wire in two directions so as to be arranged virtually in parallel with the plurality of source lines, wherein an area surrounded by said pixel electrode and said common-use electrode serves as a display section, and said pixel electrode and said common-use electrode are arranged so as to generate electric lines of force which achieve an even rotating direction of a liquid crystal molecule in all display sections of the pixel when voltage is applied, wherein said display section is virtually rectangular, and assuming that a side which is virtually in parallel with and the closest to one of said plurality of gate lines is a first side, the other sides are referred to as a second side, a third side, and a fourth side in the clockwise direction with the first side serving as an origin, the second side and the third side are constituted by one of the pixel electrode and the common-use electrode and the first side and the fourth side are constituted by the other of the pixel electrode and the common-use electrode, wherein said first side of each display section is formed by bending the pixel electrode or the common-use electrode which constitute the fourth side.

28. A liquid crystal display panel using a horizontal electric field driving system, in which a liquid crystal layer is sandwiched between a pair of opposing substrates, a plurality of gate lines and a plurality of source lines are disposed virtually orthogonal to one another between said pair of substrates, and a pixel is surrounded by the plurality of gate lines and the plurality of source lines, wherein said pixel comprises:

an active element, a pixel electrode which is connected with one of the plurality of source lines via said active element and has a wire disposed virtually in parallel with one of said plurality of source lines, and a common-use electrode which includes a main wire disposed virtually in parallel with said plurality of gate lines, and includes sub wires branching out from the main wire in two directions so as to be arranged virtually in parallel with the plurality of source lines, wherein an area surrounded by said pixel electrode and said common-use electrode serves as a display section, and said pixel electrode and said common-use electrode are arranged so as to generate electric lines of force which achieve an even rotating direction of a liquid crystal molecule in all display sections of the pixel when voltage is applied, wherein each of said pixel electrode and said common-use electrode is point-symmetrically disposed with a virtually central portion of each pixel serving as an origin, and wherein said pixel electrode is divided into two on said main wire.

* * * * *